United States Patent [19]
Adams

[11] Patent Number: 6,065,918
[45] Date of Patent: May 23, 2000

[54] SELF-DRILLING BLIND SETTING RIVET

[76] Inventor: Richard R. Adams, 6825 Arbor Lake Dr., Apt.#302, Chester, Va. 23831-8735

[21] Appl. No.: 09/345,364

[22] Filed: Jul. 1, 1999

[51] Int. Cl.[7] ..................................................... F16B 13/04
[52] U.S. Cl. ................................................. 411/29; 411/55
[58] Field of Search ................................ 411/29, 30, 55, 411/57.1, 60.1, 60.2, 60.3, 387.1–387.8

[56] References Cited

U.S. PATENT DOCUMENTS

| | | | |
|---|---|---|---|
| 2,435,876 | 2/1948 | De Swart | 411/55 |
| 4,617,692 | 10/1986 | Bond | 411/387.6 |
| 4,920,833 | 5/1990 | Rosenthal | 411/29 |

FOREIGN PATENT DOCUMENTS 1460727  1/1977  United Kingdom ..................... 411/55

*Primary Examiner*—Flemming Saether
*Attorney, Agent, or Firm*—Norman Rainer

[57] ABSTRACT

A self-drilling rivet for joining two substrate layers has a hollow sleeve member having a circular cylindrical outer surface, a divergently tapered bore, and an outwardly expandable portion. An internal member has a head portion, a threaded shaft centered within the bore, and a drilling tip extending from the threaded shaft. A wedge member interactive with the threaded shaft can be urged by turning force toward the head portion, whereby retaining wings form from the expandable portion, and are brought to bear against one of the substrate layers.

14 Claims, 1 Drawing Sheet

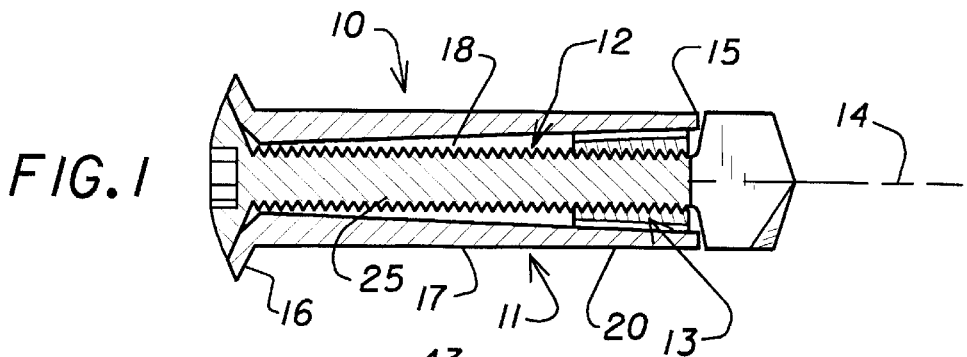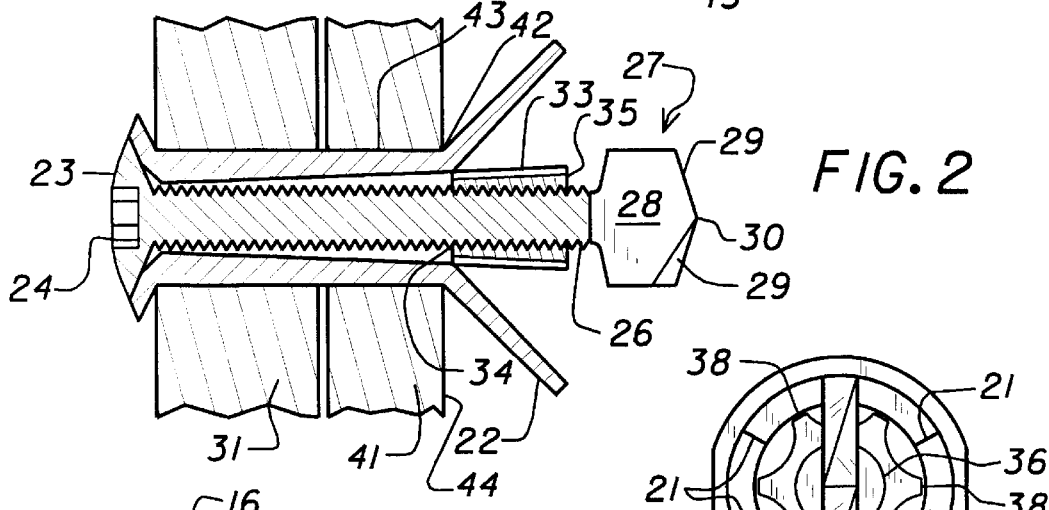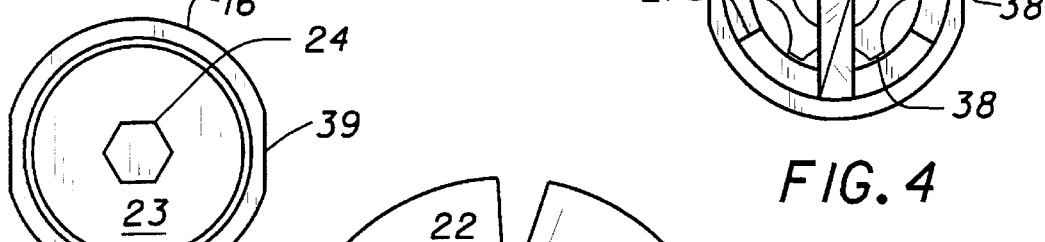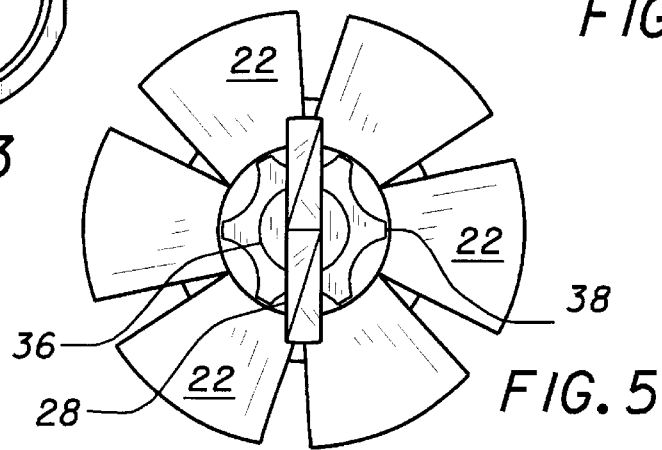

SELF-DRILLING BLIND SETTING RIVET

BACKGROUND OF THE INVENTION

1. Field of the Invention

The present invention relates generally to blind rivets which may be used to secure two layers of material together with access from one side only, and more particularly concerns an improved blind rivet which drills its own aperture through the two layers of materials and securely attaches the materials together.

2. Description of the Prior Art

Rivets have been used as fastening members for many years, beginning with the use of hot rivets which were inserted through an aperture, and peened. More recently, blind rivets have been used to secure two layers of materials together while requiring access from one side only. Blind rivets are inserted into an aperture from the front side of said layers, and fastened from the same front side. Some blind rivets are equipped at their forward, blind end with a drill bit, whereby rotation of the rivet in one direction produces the requisite holes in the layers of the material to be joined.

One technique for the fastening of blind rivets is that of the so-called "pop" rivet in which a shaft extends through a hollow cylindrical rivet sleeve having an enlarged head thereon. The rivet sleeve is typically made of a material such as aluminum. A mandrel is located on the end of the shaft, and positioned adjacent the blind end of the rivet sleeve. The rivet is inserted into aligned apertures in the joinable layers, and the shaft is placed under tension from the front surface of the uppermost layer to draw the mandrel against the rivet sleeve and toward the head of the rivet sleeve. Such action radially expands the blind end of the rivet sleeve behind the rear surface of the underlying layer.

The shaft is scored near the end attached to the mandrel, and upon the exertion of sufficient tensile force, the shaft will break off at the scored location after the rivet is set. Such blind rivets of the "pop" rivet variety are widely used today in a broad number of applications. Examples of pop rivets of the self-drilling type may be found in U.S. Pat. Nos. 3,935,786; 4,293,258 and 4,998,853. One drawback involving the use of pop rivets is that two separate tools or tool modalities must be employed, namely one tool function which supplies torque for drilling the hole, and a separate tool function which applies a high pulling force on the shaft while bearing against the head of the rivet.

Another technique for the fastening of blind rivets is to use internal threaded means to expand the rivet sleeve adjacent its blind end. Such rivets, of the self-drilling type, are disclosed in U.S. Pat. No. 5,815,906 to Johnson, and U.S. Pat. No. 5,183,357 to Palm, wherein rotation of the rivet in one direction produces the requisite hole, and rotation in the opposite direction achieves fastening of the rivet.

Blind rivets of the type which fasten by threaded means often do not provide securing strength equal to that obtainable by blind rivets of the pop rivet type. Also, self-drilling blind rivets of the type which fasten by threaded means are relatively slow in achieving fastening because of the needed revolutions of the threaded means.

It is accordingly an object of the present invention to provide a self-drilling blind rivet for joining two layers of solid substrate, said rivet having a head extremity and opposite forward extremity expandable by threaded means to achieve fastening of said rivet against said layers.

It is another object of this invention to provide a rivet as in the foregoing object which provides improved fastening strength.

It is a further object of the present invention to provide a rivet of the aforesaid nature wherein said threaded means is fast-acting in achieving expansion of the rivet.

It is a still further object of this invention to provide a rivet of the aforesaid nature which is of simple, rugged construction amenable to low cost manufacture.

These objects and other objects and advantages of the invention will be apparent from the following description.

SUMMARY OF THE INVENTION

The above and other beneficial objects and advantages are accomplished in accordance with the present invention by a self-drilling blind rivet for joining two substrate layers, and comprising:

a) a hollow sleeve member having a circular cylindrical outer surface elongated upon a straight axis between a forward extremity and outwardly flared trailing extremity and having an axially centered bore divergently tapered in going from said trailing to forward extremities, and an outwardly expandable portion adjacent said forward extremity, b) an internal member comprised of a head portion having torque-applying means, an axially centered threaded shaft, and a leading extremity having a tip capable of drilling a hole in said layers when axially rotated in a first direction, and c) a wedge member threadably interactive with said threaded shaft and moveable along said axis toward said head portion by axial rotation of said internal member in a second direction, said movement of said wedge member causing expansion of said expandable portion.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a sectional side view of an embodiment of the blind rivet of the present invention.

FIG. 2 shows the rivet of FIG. 1 in fastened engagement with the two substrate layers.

FIG. 3 is an enlarged end view taken from the left of FIG. 1.

FIG. 4 is an enlarged end view taken from the right of FIG. 1.

FIG. 5 is an enlarged end view taken from the right of FIG. 2.

DESCRIPTION OF THE PREFERRED EMBODIMENT

Referring now to FIGS. 1–5, an embodiment of the blind rivet 10 of the present invention is shown comprised of a hollow sleeve member 11 having disposed therein internal member 12 which holds wedge member 13. Said rivet is shown in functional engagement with upper and lower substrate layers 31 and 41, respectively, caused to be drawn together in tightly abutting relationship.

Sleeve member 11 is of monolithic construction, fabricated of a soft metal such as aluminum, or of moldable plastic material. Said sleeve member is elongated upon straight axis 14 between forward extremity 15 and outwardly flared trailing extremity 16, and has a circular cylindrical outer surface 17. A bore 18 is axially centered and tapered divergently in going from said trailing to forward extremities. Said outwardly divergent taper is preferably linear, in the manner of a conical section. The length of said sleeve member may be between about ¼ inch and 6 inches, and the diameter of cylindrical outer surface 17 may be between about 1/16 inch and 1 inch.

A portion of said sleeve member adjacent forward extremity 15 is of an outwardly expandable nature. Said portion, designated in the drawing by numeral 20, may occupy 20% to 80% of the length of said sleeve member extending rearwardly from said forward extremity. The expandable nature of the forward portion of the sleeve member is achieved preferably by a frangible feature involving axially directed score marks or indentations 21 circumferentially spaced about said sleeve member. Said indentations are lines of weakness which permit the controlled outward rupture of said sleeve member, producing fastening wings 22, as shown in FIGS. 2 and 5.

Internal member 12 has ahead portion 23 having torque-applying means in the form of shaped recess 24 adapted to receive the drive shaft of a socket wrench, screw driver or equivalent tool for applying turning force. An axially centered threaded shaft 25 extends from head portion 23 as a continuous integral extension thereof, and terminates in leading extremity 26.

A drilling tip 27 is fixedly associated with leading extremity 26. The exemplified embodiment of said tip is shown configured as a flat blade 28 having two inclined cutting edges 29 meeting in a centered apex 30. Tip 27, when rotated in a first direction, is capable of drilling holes in upper and lower substrate layers 31 and 41, respectively. Said layers may be comprised of plastics, wood, drywall panels, fiberglass sheets, concrete, brick, thin metal sheet, or relatively soft metals such as aluminum. Said upper layer, which is completely penetrated by the rivet of this invention, may have a thickness between about 1/32 inch and 1 inch. Lower layer 41 may be of any thickness, and is not necessarily penetrated by the rivet.

Tip 27 may either be integral with shaft 25 or a separate piece, attached to said shaft. To facilitate its hole-drilling capability, tip 27 may contain hardening coatings such as oxides, carbides, or hard metals, and may contain adhered particulate grinding agents, such as quartz or carborundum.

Wedge member 13 is normally positioned within expandable portion 20 of sleeve member 11. The exemplified embodiment of said wedge member is shown to have a generally frustro-conical exterior contour defined by conically inclined outer boundary 33 extending between first and second transverse surfaces 34 and 35, respectively. The angle of conical inclination of said outer boundary substantially matches the taper angle of bore 18 of said sleeve member. A threaded bore 36 extends orthogonally between said transverse surfaces, and engages threaded shaft 25. The manner of such threaded engagement is such that, when shaft 25 is rotated in a second direction, namely counter to the rotational direction which actuates drilling tip 27, wedge member 13 is drawn toward the trailing extremity 16 of sleeve member 11. Such movement of wedge member 13 causes outward expansion of sleeve member 11 in said expandable portion 20, said expansion causing the 10 formation of fastening wings 22. In those instances where the rivet penetrates both substrate layers 31 and 41, said wings are forced against the circular perimeter 42 defined by the intersection of circular hole 43 with inner surface 44. In those situations where lower substrate layer 41 is not penetrated by the rivet, said wings are caused to engage the wall of hole 43 with considerable retaining force.

In order that shaft 25 may advance wedge member 13 axially within sleeve member 11, it is necessary that wedge member 13 resist rotation about axis 14. Means for preventing such rotation are exemplified in the form of longitudinal flutes 38 disposed in outer boundary 33. Said flutes cause said wedge member to frictionally grip the interior surface of bore 18, thereby preventing rotation therein. To augment said rotation-preventing expedient, longitudinal spines may be disposed within the interior surface of bore 18 in a manner to interact with flutes 38.

In order to simplify the manufacture of the rivet of this invention, wedge member 13 may be fabricated of two halves which snap together onto threaded shaft 25. Further, in order to prevent rotation of said sleeve member during the turning of shaft 25, trailing extremity 16 may be outwardly flared and provided with flat facets 39 to facilitate gripping by a wrench. By virtue of the aforesaid components and their mode of interaction, the blind rivet of the present invention can be easily installed into two substrate layers lying in parallel juxtaposition, and can quickly draw said layers into tight joinder with relatively few reverse turns of internal member 12.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A self-drilling blind rivet for joining two substrate layers, and comprising:
   a) a hollow sleeve member having a circular cylindrical outer surface elongated upon a straight axis between a forward extremity and outwardly flared trailing extremity and having an axially centered bore divergently tapered in going from said trailing to forward extremities, and an outwardly-expandable portion adjacent said forward extremity,
   b) an internal member comprised of a head portion having torque-applying means, an axially centered threaded shaft, and a leading extremity having a tip capable of drilling a hole in said layers when axially rotated in a first direction, and
   c) a wedge member threadably interactive with said threaded shaft and moveable along said axis toward said head portion by axial rotation of said internal member in a second direction, said movement of said wedge member causing expansion of said expandable portion.

2. The rivet of claim 1 wherein said sleeve member is of monolithic construction.

3. The rivet of claim 1 wherein said outwardly divergent taper is linear, in the manner of a conical section.

4. The rivet of claim 1 wherein the length of said sleeve member, measured between said forward and trailing extremities, is between ¼ and 6 inches.

5. The rivet of claim 4 wherein the diameter of said cylindrical outer surface is between 1/16 and 1 inch.

6. The rivet of claim 4 wherein said outwardly expandable portion occupies between 20% and 80% of the length of said sleeve member extending rearwardly from said forward extremity.

7. The rivet of claim 6 wherein said expandable portion is of a frangible nature, having circumferentially spaced and axially directed lines of weakness which permit controlled outward rupture of said sleeve member to produce fastening wings.

8. The rivet of claim 1 wherein said torque-applying means is a shaped recess adapted to receive a tool for applying turning force.

9. The rivet of claim 1 wherein said tip is a flat blade having two inclined cutting-edges meeting in an apex centered upon said axis.

10. The rivet of claim 9 wherein said tip is integral with said threaded shaft.

11. The rivet of claim 1 wherein said wedge member has a frustro-conical contour defined in part by a conically inclined outer boundary.

12. The rivet of claim 11 wherein the angle of conical inclination of said outer boundary matches the taper angle of said axially centered bore.

13. The rivet of claim 11 wherein said outer boundary contains flutes.

14. The rivet of claim 11 wherein said trailing extremity is provided with flat facets to facilitate gripping by a wrench to prevent rotation of said sleeve member.

* * * * *